United States Patent [19]
Adams, Jr.

[11] Patent Number: 5,141,211
[45] Date of Patent: Aug. 25, 1992

[54] UNIVERSAL WORK STATION

[76] Inventor: Joseph E. Adams, Jr., McKern Rd., Rome, N.Y. 13440

[21] Appl. No.: 745,540

[22] Filed: Aug. 15, 1991

[51] Int. Cl.$^5$ ............................................. B66F 3/00
[52] U.S. Cl. ...................................... 269/16; 269/17; 269/69
[58] Field of Search ...................... 269/17, 15, 16, 69, 269/76, 45, 47; 254/8 B, 124, 2 B, DIG. 1, 133, 134

[56] References Cited

U.S. PATENT DOCUMENTS

| | | | |
|---|---|---|---|
| 2,312,914 | 3/1943 | Koszeghy | 269/69 |
| 2,513,959 | 7/1950 | Onsrud | 269/69 |
| 2,903,238 | 9/1959 | Flandrick | 254/124 |
| 3,086,751 | 4/1963 | Poznik | 254/8 B |
| 3,599,812 | 8/1971 | Hasstedt et al. | 254/8 B |
| 4,010,942 | 3/1977 | Ward | 269/76 |
| 4,122,956 | 10/1978 | Hargrove | 269/16 |
| 4,145,006 | 3/1979 | Webb | 269/76 |
| 4,659,072 | 4/1987 | La Rosa | 269/17 |
| 4,705,264 | 11/1987 | Hawkins et al. | 269/17 |
| 4,899,985 | 2/1990 | Good | 254/124 |

*Primary Examiner*—Robert C. Watson
*Attorney, Agent, or Firm*—William M. Hobby, III

[57] ABSTRACT

A universal work station apparatus has a base with a vertically extending post attached thereto. The base has four legs attached thereto and each leg may have a wheel or roller thereon and at least two of the legs have a telescoping extension. Each of the legs can be rotated and positioned in different predetermined positions to accommodate different work loads attached to the work station. The four legs generally extend an equal distance in four directions but the legs can be repositioned and telescoped for a second position for supporting large elongated work pieces. A plurality of interchangeable work support attachments are attached to the vertical post. In addition, tool attachment trays are provided along with one tray with a hardware cloth bottom can be positioned for cleaning tools and workpieces placed thereon. A universal work mounting attachment allows the attachment of a large number of small engines, transmissions, and other pieces of work. A tool tray attachment has one edge having a magnet along one edge for holding tools on the edge thereof. Other attachments include a vise attachment and tire mounting and demounting tools. The trays and tool holders are attached to the vertical post with a side mount which clamps onto the post supported through pins extending through apertures in the post and a top mount coupling inserts into a square channel post top opening. All the attachments are coupled with quick removing pins so that the work station can be rapidly converted to different configurations for different jobs.

15 Claims, 3 Drawing Sheets

UNIVERSAL WORK STATION

BACKGROUND OF THE INVENTION

The present invention relates to a universal work station and especially to a universal work station having a variety of quick coupling tool and work holders and adjustable legs.

The present invention is directed towards a universal work station which provides a work positioner and support by means of which articles of work of various shapes and sizes may be supported thereon in different positions on the work station and tools may be properly positioned in different positions and the legs may be rapidly modified to support heavy elongated work members, such as engines or transmissions.

Prior art work stations have been provided for supporting a great variety of work members and for supporting tools or the like. Sometimes these work members are provided with wheels or casters but typically the prior work holder is designed specifically to hold one specific type of work even though that work member may come in various sizes and shapes. Typical prior art work holders have long been devised for engines to bolt an engine block or engine directly thereto for supporting the engine while machine work or other work is being performed on the engine. These are commonly used in rebuilding or doing other machine work on internal combustion engines, such as found in automobiles. Other work stands are designed specifically to hold transmissions which are bolted onto a work station similar to that found in work holders for internal combustion engines. Other work holders have been designed for holding small engines which are not cantilevered such as to require extended support from the legs. It has also been common in the past to provide specific work holders for providing more precise alignment and this is common in work holders which hold automobile doors as well as doors for a building. The doors can be supported while they are painted or worked on and can be removed and replaced in precise alignment with the vehicle or building. It can also be used for mounting new doors and may have various types of adjustments for aligning the hinges for attaching the doors. Most of the prior art work supports either bolt the work to a specially designed fixture or have special clamps, brackets, or supporting surfaces to hold the workpiece while it is being worked upon and sometimes provides for adjusting the work piece to a variety of different positions or for final adjustments.

Prior art U.S. patents which show various types of work supports may be seen in the Hawkins et al. patent, U.S. Pat. No. 4,705,264, for a wheeled stand assembly having an engine mount bracket for attaching an engine block thereto and utilizing a tray forming a frame for the base. This engine mount has two extending legs with four casters thereon. In the Hanger patent, U.S. Pat. No. 4,239,196, an engine stand is illustrated having a universal mounting apparatus for securing loads such as different size automotive engines. This engine stand is a wheeled stand having a pair of telescoping legs for increasing the support of the cantilevered engine and brackets that can be adjusted for attaching different engines. In the U.S. patent to Dubbs et al., a stand and support is provided for small engines, small motors, generators, and air compressors for use in servicing pieces of work and provides for adjusting the position of the work pieces. In the U.S. patent to Armstrong, U.S. Pat. No. 4,691,904, an automatic or standard transmission holding stand is provided which is wheeled and has attachments for transmissions which can be adjusted to different positions and the Friese patent, U.S. Pat. No. 2,188,433, a work holding devices provides a uniform attachment system for attaching a variety of different work pieces to a pair of spaced work supporting arms which can have various attachments attached thereto and can be rapidly moved in and out from each other. In the Anderson patent, U.S. Pat. No. 2,763,053, a universal work positioner allows a variety of adjustments through a universal joint to position a work piece in different positions. Similarly, the Webb patent, U.S. Pat. No. 4,145,006, is a work piece mounting stand having a variety of adjustments through which is universal and it allows a work piece to be rotated in any direction. The DeRouen patent, U.S. Pat. No. 4,209,166, is a universal jack and work positioning mechanism while the Krause patent, U.S. Pat. No. 2,488,296, is a work support which can position an article in various positions while work is being done on the article. The Valenta patent, U.S. Pat. No. 1,515,915, is a portable repair un.it which is on wheels and having three vertically extending telescoping U-shape supports with one having a vise mounted thereon.

In contrast to these prior art devices, the present invention is directed to a more universal work station in which engines and transmissions can be readily attached thereto for performing work thereon but at the same time small engines, electric motors, and generators can be attached through a universal connection for small components and the tool can be rapidly configured with tool trays, a tool cleaning tray with rapid coupling and a decoupling components and rapidly adjustable leg positioning system.

SUMMARY OF THE INVENTION

A universal work station apparatus has a base with a vertically extending post attached thereto. The base has four legs attached thereto and each leg may have a wheel or roller thereon and at least two of the legs have a telescoping extension. Each of the legs can be rotated and positioned in different predetermined positions to accommodate different work loads attached to the work station. The four legs generally extend an equal distance in four directions but the legs can be repositioned and telescoped for a second position for supporting large elongated work pieces. A plurality of interchangeable work support attachments are attached to the vertical post. In addition, tool attachment trays are provided along with one tray with a hardware cloth bottom can be positioned for cleaning tools and workpieces placed thereon. A universal work mounting attachment allows the attachment of a large number of small engines, transmissions, and other pieces of work. A tool tray attachment has one edge having a magnet along one edge for holding tools on the edge thereof. Other attachments include a vise attachment and tire mounting and demounting tools. The trays and tool holders are attached to the vertical post with a side mount which clamps onto the post supported through pins extending through apertures in the post and a top mount coupling inserts into a square channel post top opening. All the attachments are coupled with quick removing pins so that the work station can be rapidly converted to different configurations for different jobs.

BRIEF DESCRIPTION OF THE DRAWINGS

Other objects, features, and advantages of the present invention will be apparent from the written description and the drawings in which.

DESCRIPTION OF THE PREFERRED EMBODIMENTS

Figure 1:
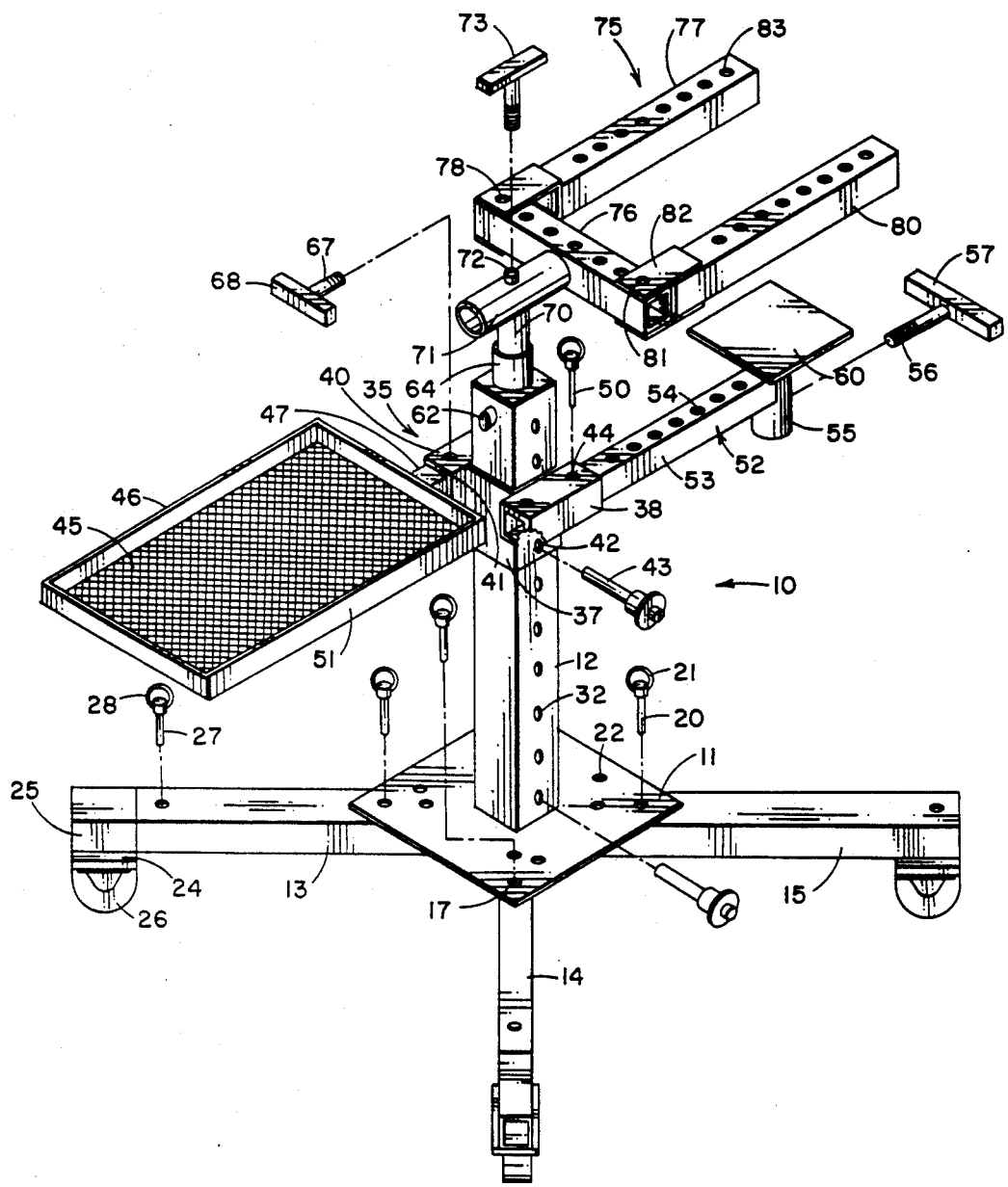
FIG. 1 is a perspective view of a universal work station in accordance with the present invention.
Figure 2:
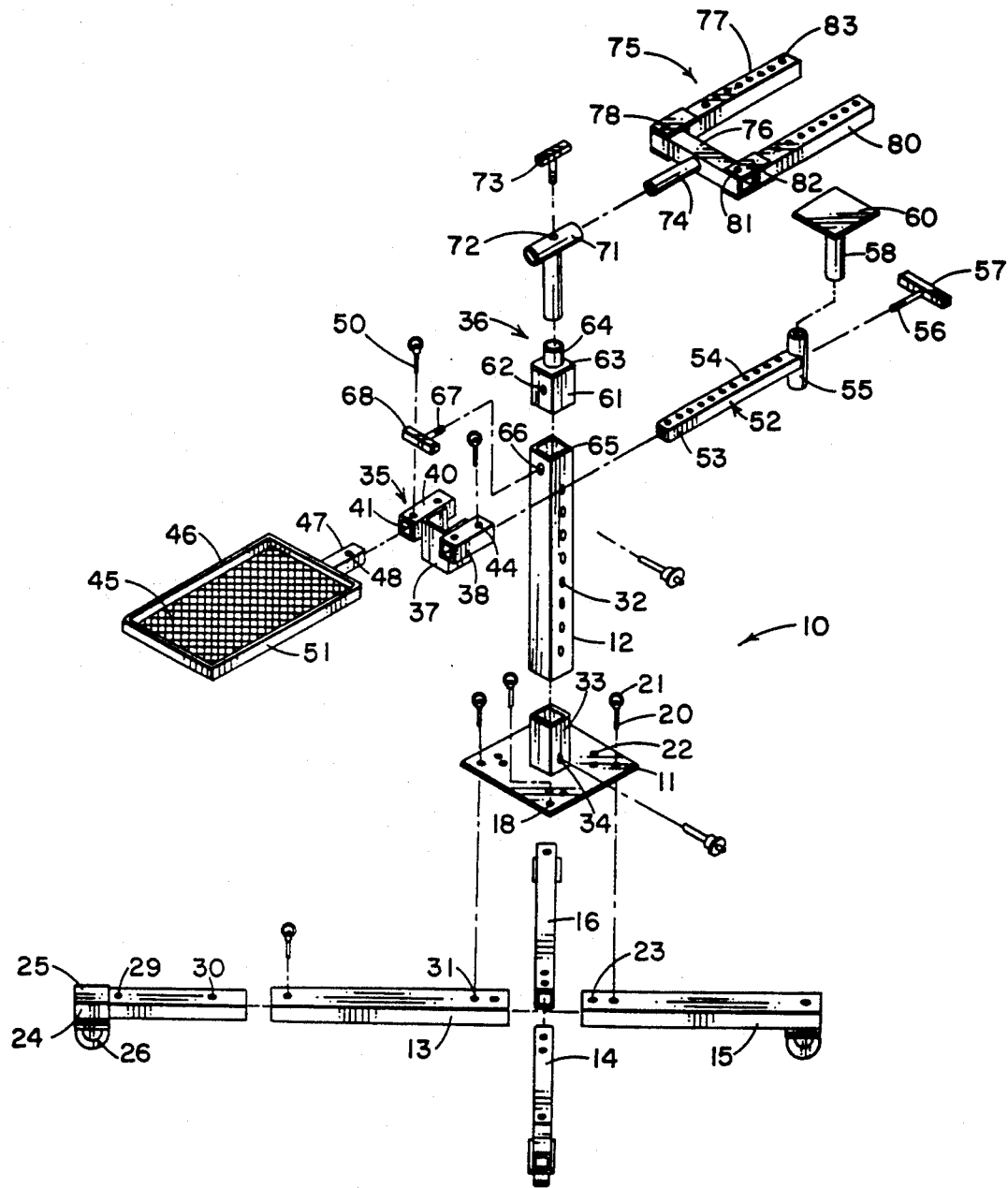
FIG. 2 is an exploded perspective view of the work station of FIG. 1.
Figure 3:
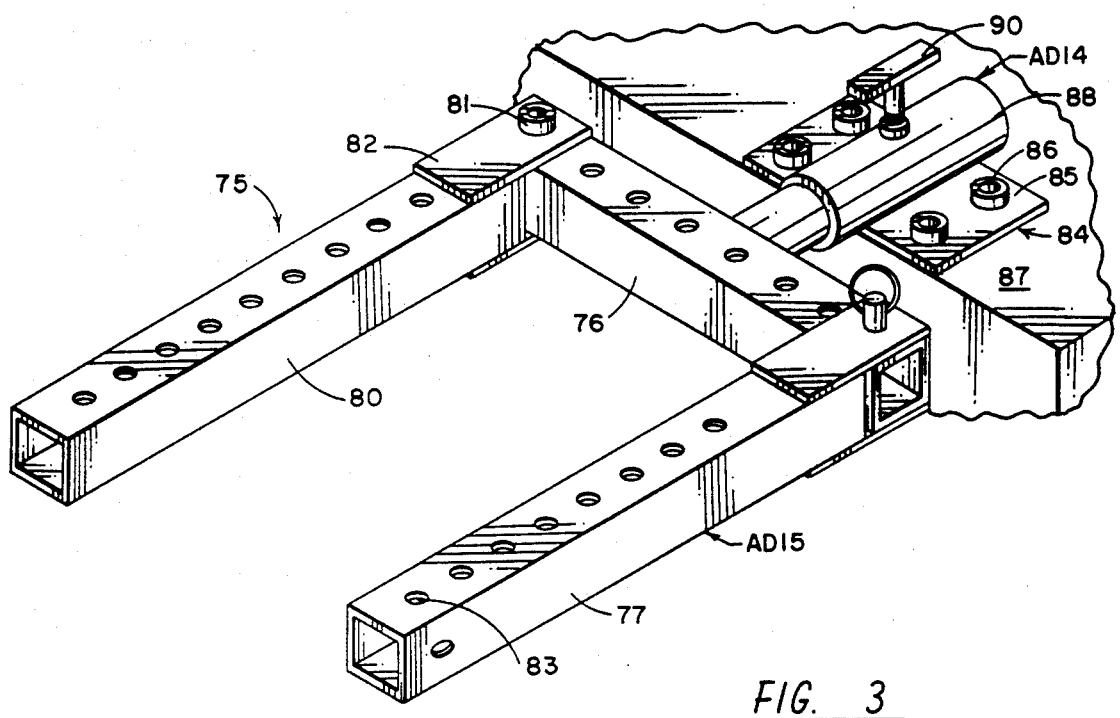
FIG. 3 is a perspective view of the universal engine attachment shown in FIGS. 1 and 2.
Figure 4:
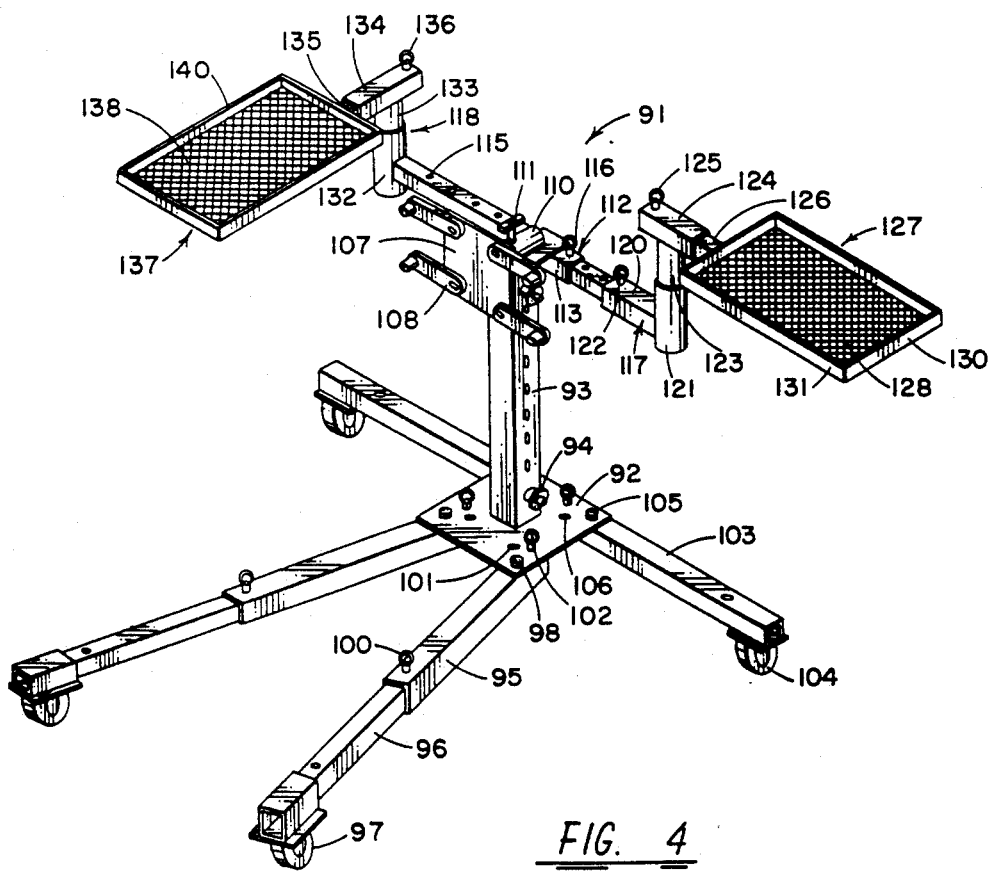
FIG. 4 is a perspective view of an alternate embodiment of the universal stand of FIGS. 1-3.

Referring to FIGS. 1-3 of the drawings, a universal work station 10 is illustrated having a base 11 with a vertically extending post 12 along with a pair of telescoping legs 13 and 14 and a pair of non-telescoping legs 15 and 16. The base can be seen to be a flat square piece of heavy steel having a square channel steel post 12. The legs 13, 14, 15, 16 are hollow channeled steel members, each one of which is attached to the base 11 with bolts 17 passing through apertures 18 in the base plate 11. A plurality of pins 20 having handles 21 thereon can be inserted in one of two different openings 22 for each leg so that by swinging the leg on the bolt 17 beneath the base 11, a hole 23 in each leg can be aligned with one of the holes 22 to lock the leg in different positions. This allows the legs to be positioned in at least two different positions in which the telescoping legs 13 and 14 can be extended in the same general direction for holding a heavy cantilevered type object as seen in FIG. 4 and the two legs 15 and 16 can be positioned for better side support. The telescoping legs 13 and 14 each have a telescoping leg member 24 which supports the wheel or caster in a supporting bracket 25 having a wheel 26 therein. The telescoping leg is extended by lifting the quick coupling pin 27 by its handle 28, then telescoping the telescoping portion 24 outwards where the pin 27 will align with a second hole 30 in the telescoping arm. A hole 31 allows the pin to hold the leg in the non-extended position. The bolts 17 are attached through the openings 18 and also through the openings 31 in each of the legs. The vertically extending posts 12 includes a plurality of apertures 32 spaced in equal increments and is a square channel that slides over a post supporting bracket 33 and shaped like a square channel and having an aperture 34 therein for alignment with the bottom aperture 32 of the vertically extending post 12. The post supporting bracket 33 can be welded to the base plate 11.

The apertured post 12 has a post attaching coupling member 35 and a post top attaching coupling 36. The side coupling 35 has a U-shaped bracket 37 and two square channel sleeves 38 and 40, each of which is hollow and has a plurality of openings 41 therein. Similarly, the U-bracket has an aperture 42 in each arm of the "U" so that the U-bracket portion 37 can be slipped over vertically extending post 12 and a pin 43 slipped through the apertures 42 and through any one of the apertures 32 in the vertically extending post 12. This thereby attaches the pair of sleeves 38 and 40, each of which have a pair of apertures 44 therein to allow the coupling of any work or tool support desired which has a square bar attached on one end, such as a tool or work supporting tray 45 having edges 46 and a square tray supporting bar 47 having an aperture 48 therein. Sliding the bar 47 into either one of the sleeves 38 and 40 and sliding a quick attaching pin 50 into one of the opening 44 attaches the tray to the work station. The tray 45 has a magnet strip 51 along one lip 46 so the tools may be supported thereon and can be rapidly grasped and returned while working on a workpiece. The tools can also be supported in the tray 45. A universal coupling 45 can also have a second work or tool support member 52 attached thereto which has a square supporting bar 53 having a plurality of openings 54 therein and having a hollow sleeve 55 attached perpendicular to the bar 54. Sleeve 55 has a threaded aperture therein so that a threaded locking member 56 having a handle 57 can be screwed therein to lock a piece having a cylindrical bar member 58 sliding in the sleeve 55 and then locked with the threaded locking member 56 in any positions desired. Similarly, the cylindrical coupling bar 48 can be allowed to rotate freely within the sleeve 55 as desired and a plate 60 attached to the cylindrical coupling member 58 can be used to support a work member or a vise or any other desired work piece or another tray. The plate 60 can be rapidly removed from the sleeve 55 and another member slipped into the sleeve to change the work piece, work holder, or work table by merely loosening the threaded lock 56, removing the sleeve coupling 58 from the sleeve 55 and replacing it with another member.

Referring now to top of the work post, top coupling 36 includes a square coupling member 61 having an aperture 62 therethrough with a flange 63 on top of the square insert portion 61 and a cylindrical support coupling member 64 attached to the top of the flange portion 63. The square coupling portion 61 can be inserted into the top 65 of the post 12 which has a threaded opening 66 therein for locking the coupling member 61 with the threaded lock 67 having a handle 68. Thus, the member 61 can be slid into the top opening 65 of the post 12 and the threaded lock 67 threaded into the opening 66 and into the opening 62 of the coupling member 61 to lock it in place or to quickly remove it as desired. Once this is locked in place, a hollow cylindrical coupling member 70 can be slid into the coupling member 64 and a coupling member 70 may have a perpendicular extending coupling sleeve 71 attached thereto. Sleeve 71 has a threaded aperture 72 therein for locking the coupled member with the threaded lock 73. Thus, any work holding member having a cylindrical shaped rod, such as the rod 74 of the universal work supporting bracket 75, can be slid into the cylindrical member 71. The work supporting bracket 75 can then be rotated to any position desired and locked in position by screwing the coupling lock 73 down onto the cylinder rod 74.

The universal work supporting bracket 75 has a fixed arm 76 attached to the perpendicularly extending coupling portion 74 and has arms 77 pinned with pin 78 to one end of the support 76 and an arm 80 pinned with pin 81 to the other end thereof using a yoke portion 82 on the end of the arms 77 and 80. The arms 77 and 80 each have a plurality of apertures 83 therein. Thus, the arms 77 and 80 can each be swung at an angle on the pin 78 and 81 to align the holes 83 up with a variety of different small engines, motors, generators, which can be bolted thereto. The workpiece can then be rotated to any position desired by rotating the universal work supporting bracket 75 to rotate the cylindrical bar 74 in the sleeve 71 and locking it in place with the locking member 73. The universal locking bracket 75, as shown in FIG. 3, can also be removed from the universal work station and be attached to a fixed position using a coupling bracket 84 having a flange portion 85 with a plurality of bolts 86 holding it to a work bench 87. The hollow cylindrical coupling member 88 is attached to the flange portion 85 and a threaded locking member 90 and can hold the universal work support 75 to a fixed desk. The bracket member can then be rapidly removed from the supporting bracket 84 with the work piece attached and attached to the wheeled universal work station 10 and wheels are positioned as desired for working on the piece.

Referring now to FIG. 4, an alternate embodiment of the universal work stand 91 is illustrated having a base 92 with a vertically extending post 93 extending therefrom and attached to the base member 92 with locking pin 94 in the same manner as in the embodiments of FIGS. 1 and 2. A pair of telescoping legs 95 have telescoping portions 96 along with wheels 97 thereon and are held to the base 92 with bolts 98. The telescoping portion 96 can be held in an extended position with pins 100 or in a retracted position as desired while the legs 95 can be rotated and pinned through apertures 101 with locking pins 102. Similarly, a pair of non-telescoping legs 103 have wheels 104 and are rotated on bolts 105 for locking with a pin 102 in one of the apertures 106. In this figure, the legs 95 are shown telescoping out and have been positioned to extend in generally the same direction while the legs 103 have been rotated to extend in a generally straight line to each other so that an elongated object can be supported extending over the legs 95 to obtain side support from the legs 103. In this case, an engine or engine block mount 107 has adjustable arms 108 for attaching to an engine block or to a transmission for a vehicle so that the engine can extend out over the legs 95 and be held in a cantilevered position. The bracket 107 has a cylindrical coupling arm on the back thereof for sliding in the cylindrical sleeve 110 and locked with a threaded lock 111, the same as in the top locking portion 36 of FIGS. 1 and 2.

This embodiment has a side coupling 112 having a steel channel 113 on either side thereof for attaching a square shaped bar 114 through the channel 112 and locked thereto in any position in one of the apertures 115 with a locking pin 116. Once the bar 114 has been extended through the sleeve 113, coupling attachment 117 can be placed on one end while the bar 114 may have a coupling attachment 118 fixedly attached to the other end as desired. Coupling attachment 117 has a hollow channel portion 120 having a hollow sleeve 121. Channel 120 is slipped onto the end of the bar 114 and held with a pin 122 while the sleeve 121 may have a variety of attachments attached with a cylindrical coupling bar 123. In this case, a hollow channel member 124 is attached to the top of the cylindrical bar 123 and held by a pin 125 and a square bar 126 is attached to the end of a tool tray 127 which tray has a bottom 128 and lips 130 therearound with a magnet 131 attached along the edge of lip 130 for holding tools or the like. The coupling 118 has a cylindrical sleeve 132 attached to the bar 114 for receiving a cylindrical bar 133 therein having a steel channel coupling member 134 attached thereto for holding a square steel bar 135 with a pin 136. In this case, a cleaning tray 137 has the bar 135 attached thereto. The bottom of the cleaning tray may be hardware cloth 138 or the like with a side lip 140. This advantageously allows tools or other components to be cleaned to be placed on the bottom 138 and the tray 137 placed over a cleaning bucket with solvents therein which can be poured over the tools to fall through the screen into the bucket. Alternatively, a standard cleaning tank with solvents therein can be rolled beneath the screen tray 137 and the solvents pumped over the tray and through the screen to clean the components.

It should be clear that the present invention is adapted to attach not just the more universal work piece holders and trays illustrated but any of a variety of work members or tools and that the universal work station can be rapidly converted to a variety of specialized purposes, such as a tool for removing a tire from a rim including breaking of the bead as well as removing the rim of the tire from the wheel and any work holding member desired can be attached by simply placing a square or cylindrical coupling member attached to one end thereof for sliding a tool onto an existing coupling member which allows for a wide variety of individual and specialized work holding members to be quickly attached to the universal work station. However, the present invention is not to be construed as limited to the forms shown which are to be considered illustrative rather than restrictive.

I claim:

1. A universal work station comprising:
   a base;
   a plurality of legs attached to said base, at least two of said legs being telescoping legs adjustable as to length and as to angle on said base for switching between first and second positions, said adjustable legs being pinned to said base for rotation thereon and having a second position having said legs extended in length and positioned at a smaller angle to each other than in said first position;
   a post attached to said base and extending in a generally vertical direction, said post having a plurality of apertures therein;
   work support means, including a plurality of work support attachments, each attachment being removably attachable to said post for attaching and holding a work piece to said work station, at least one said work support attachment being attached to said post to attach a work piece extending over said two adjustable legs when said legs are in said second position; whereby heavier more elongated items can be attached to said work station in the second position and other work pieces can be attached thereto in said first position.

2. A universal work station in accordance with claim 1 in which each said leg has a wheel mounted thereon.

3. A universal work station in accordance with claim 2 including a tool tray attachment.

4. A universal work station in accordance with claim 3 in which said adjustable legs are pinned for rotation on said base and each leg has aligning openings therein and said base has openings therein for locking each said leg to a predetermined opening in said base with a lock pin in predetermined positions.

5. A universal work station in accordance with claim 4 in which each attachment has a coupler thereon for coupling onto the top portion of said post.

6. A universal work station in accordance with claim 5 in which one said workpiece attachment is a universal workpiece attachment having a post coupling attached to a frame member rotatably on said coupling and having a pair of angularly adjustable arms pinned to said frame, member, each said adjustable arm having a plurality of openings therethrough whereby a workpiece can be bolted to said arms through said holes therethrough when arms are swung to attaching position.

7. A universal work station in accordance with claim 6 in which said post coupling has square insert inserted into a square post and has a flange around said square insert for supporting on top of said post and said square insert is locked in place with a threaded lock threaded through said post into the side of said square insert.

8. A universal work station in accordance with claim 7 in which post coupling has a cylinder support sleeve attached on said square insert member over said flange and has a cylinder support member rotatably mounted in said cylinder support sleeve and attached to said work support frame member.

9. A universal work station in accordance with claim 8 in which a threaded lock member is threaded through said cylinder support sleeve to lock said cylinder support member in position in said cylinder support sleeve.

10. A universal work station in accordance with claim 9 in which said threaded lock member has a handle thereon.

11. A universal work station in accordance with claim 10 having one said work tray having a screened bottom and supported on an extendable arm for postioning over a cleaning bath positioned therebelow.

12. A universal work station in accordance with claim 11 in which a removably support arm is removably attachable to said post and has a perpendicular sleeve attached to the end thereof.

13. A universal work station in accordance with claim 12 in which said tool tray has a magnetic tool attaching member thereon for holding tools thereon.

14. A universal work station in accordance with claim 13 in which a post attachment member has a pair of hollow channels attached together with a "U" bracket shaped to fit around said post and to be bolted through said post apertures.

15. A universal work station in accordance with claim 14 in which said post is removably bolted to said base for changing the height of said post.

* * * * *